(12) United States Patent
Otto et al.

(10) Patent No.: US 7,335,410 B2
(45) Date of Patent: *Feb. 26, 2008

(54) COMPOSITION AND PROCESS FOR MANUFACTURING POLYESTER

(75) Inventors: Brigitta Otto, Milow (DE); Eckhard Seidel, Frankfurt am Main (DE); Thomas Steinbrecher, Obernburg (DE)

(73) Assignee: Zimmer AG, Frankfurt am Main (DE)

(*) Notice: Subject to any disclaimer, the term of this patent is extended or adjusted under 35 U.S.C. 154(b) by 586 days.

This patent is subject to a terminal disclaimer.

(21) Appl. No.: 10/000,595

(22) Filed: Oct. 19, 2001

(65) Prior Publication Data

US 2003/0018160 A1    Jan. 23, 2003

(30) Foreign Application Priority Data

May 3, 2001 (DE) ................. 101 21 542

(51) Int. Cl.
*B29D 22/00* (2006.01)

(52) U.S. Cl. ............ 428/35.7; 428/364; 520/104; 520/110; 520/111; 520/182; 524/706; 524/710; 524/711; 524/765; 524/783; 524/784; 524/789; 528/272; 528/274

(58) Field of Classification Search ........ 528/274, 528/275, 279, 283, 285, 286, 302, 308, 308.6, 528/272; 524/706, 710, 711, 765, 783, 784, 524/789; 428/35.7, 364; 502/104, 110, 502/111, 182; 520/104, 110, 111, 182
See application file for complete search history.

(56) References Cited

U.S. PATENT DOCUMENTS

| 5,565,545 | A | * | 10/1996 | Kriesche et al. ............ 528/285 |
| 5,733,969 | A | * | 3/1998 | Thiele ........................ 524/791 |
| 5,744,572 | A | | 4/1998 | Schumann et al. |
| 5,756,033 | A | | 5/1998 | Schumann et al. |
| 5,789,528 | A | | 8/1998 | Martl et al. |
| 5,856,424 | A | * | 1/1999 | Bowers et al. ............ 528/272 |
| 6,358,578 | B1 | * | 3/2002 | Otto et al. ................ 428/35.7 |
| 6,417,320 | B1 | * | 7/2002 | Otto et al. ................ 528/279 |

FOREIGN PATENT DOCUMENTS

| BE | 878 249 | 2/1980 |
| DE | 196 27 591 | 1/1997 |
| EP | 1 031 590 | 8/2000 |
| EP | 1 099 720 | 5/2001 |
| EP | 1 156 070 | 11/2001 |

OTHER PUBLICATIONS

Patent Abstracts of Japan, vol. 017, No. 195, Publication No. 04345617, Apr. 16, 1993.
Patent Abstracts of Japan, vol. 1998, No. 14, Publication No. 10231357, Feb. 9, 1998.

* cited by examiner

*Primary Examiner*—Terressa Boykin
(74) *Attorney, Agent, or Firm*—McDonnell Boehnen Hulbert & Berghoff LLP

(57) ABSTRACT

The invention relates to a composition suitable for catalysis in a process for the manufacture of polyester containing as Component I a carrier substance on which catalytically effective metal compounds are adsorbed and as Component II a phosphonic acid compound.

13 Claims, No Drawings

COMPOSITION AND PROCESS FOR MANUFACTURING POLYESTER

BACKGROUND OF THE INVENTION

1. Field of the Invention

This invention relates to a composition and process for the manufacture of polyester. In the process according to the invention, the polycondensation is catalysed, stabilised and accelerated by the composition.

2. Summary of the Related Art

DE 199 08 628.1 discloses a catalyst system consisting of a glycolic suspension of a fine-grained carrier substance exhibiting a large porous surface in which catalytically effective metal compounds are adsorbed in the pores. Also, phosphonic acid compounds are used as stabilizers for polycondensation. In the examples, 2-carboxyethane phosphonic acid (phosphono-propionic acid) is employed as a stabilizer. Furthermore, stabilizer is added at a different time than the catalyst and is as temporally remote as possible.

Other stabilizers, such as phosphoric and phosphorous acid, "simple" phosphonic acid esters and "simple" glycol phosphates, and carboxymethane phosphonic acid have no polycondensation accelerating effect; rather, when the phosphorus concentration is increased, the polycondensation rate decreases and the catalyst is partially blocked by the stabilizer.

DE 4432839 discloses the use of tris-triethylene glycol phosphate as a stabilizer in polyester manufacturing processes catalysed by antimony and germanium to inhibit polymer turbidity.

Polyalkylene glycol phosphate esters are known in in the art as stabilizers and with other conventional catalytic agents, such as antimony, germanium, titanium or tin, do not have an accelerating effect on the polycondensation.

In EP-A-589197, polyalkylene glycol phosphate esters are described as flame retarding co-monomers.

The effect of polyalkylene glycol phosphate ester and especially tris-triethylene glycol phosphate as polycondensation catalysts is not known.

DE 19631068 disclosed carboxy-phosphonic acid compounds as polycondensation accelerators in polyester manufacture in a concentration from 30 to 900 ppm relative to the phosphorus of the carboxy-phosphonic acid compound. The carboxy-phosphonic acid compounds effect cross-linking of the polymer chains and also protect against thermal and thermo-oxidative polymer decomposition.

It is also known that stabilizers containing phosphorus impair the activity of the catalytic agents in the esterification and transesterification phases as well as the precondensation phase because they form inactive compounds with the catalytic agents.

Furthermore, balanced, specific process methods are known in which defined catalyst and stabilizer concentrations and additive positions or additive times are controlled, wherein the addition of the stabilizer occurs after that of the catalyst.

With transesterification it is also usual to block the transesterification catalyst with an appropriate amount of a phosphorus compound to prevent the detrimental effect of the transesterification catalyst on the polycondensation. Only after this blocking is the polycondensation catalyst added, followed later by addition of the appropriate polycondensation stabilizer.

Furthermore, it is also known that in the manufacture of polyester for some applications (e.g., packaging and technical yarns) crystallization and polycondensation are carried out in solid state (U.S. Pat. No. 4,064,112, U.S. Pat. No. 4,263,425, U.S. Pat. No. 5,362,844). In other applications, fibers or filaments, for example, are spun directly or preforms are directly produced, wherein intermediate transition to a solid state and renewed melting of the polymer is not required.

SUMMARY OF THE INVENTION

The present invention provides a composition for catalysis in a process for the manufacture of polyester suitable for bottles, films, foils, fiber materials and technical plastics as well as an improved process for the manufacture of polyesters.

DETAILED DESCRIPTION

In one aspect, the invention provides a composition comprising as Component I a carrier substance on which at least one catalytically effective metal compound is adsorbed and as Component II:

(a) one or more phosphonic acid compounds of the formula I

wherein two of the groups $R_1$, $R_2$ and $R_3$ are —H and the third group is —H or $C_{1-10}$-alkyl, $C_{3-10}$-cycloalkyl or $C_{6-10}$-aryl, and R is $C_{2-10}$-alkylene-carboxy, $C_{3-10}$-cycloalkylene-carboxy or $C_{6-10}$-arylene-carboxy, wherein the carboxy group is adjacent to $R_1$, and/or (b) one or more compounds of formula I wherein R is O and $R_1$, $R_2$ and $R_3$ are independently tris-trialkylene glycol groups.

The carrier substance can be selected from active carbon, diatomaceous earth, zeolites, synthetic silicates, natural silicates, silicon oxides, silicon hydrates, fullerenes and cross-linked polymers. In a preferred embodiment of the invention, the mean grain size ($d_{50}$) of the carrier substance is 0.05 to 2.0 μm, more preferably 0.1 to 1.0 μm. The specific area of the particles forming the carrier substance, determined according to the BET method, is preferably >50 m²/g, and more preferably >500 m²/g.

Preferably, the catalytically effective metal compound is selected from Ti, Zr, Sb, Ge, Sn and Al compounds in which the metal is in an ionic state. Examples of suitable metal compounds are tetrabutyl titanate, tetrapropyl titanate, $TiO_2$, $ZrO_2$, zirconium acetyl acetonate, $Sb_2O_3$, Sb-acetate, $GeO_2$, tetrabutyl tin, dibutyl tin diacetate, and $SnO_2$.

The weight ratio of the carrier substance to the metal of the catalytically effective metal compound is preferably in the range of 1:50 to 50:1, more preferably 1:2 to 20:1.

Examples of $R_1$, $R_2$ and $R_3$ in Component II(a) are hydrogen, methyl or ethyl and in Component II(b) tris-ethylene, tris-propylene and tris-butylene glycol groups. R is preferably 2-carboxyethyl, 2-carboxypropyl or 2-carboxybutyl for Component II(a). Examples of phosphonic acid compounds for Component II(a) are 2-carboxyethyl phosphonic acid, methyl 2-carboxyethyl phosphonate, ethyl 2-carboxyethyl phosphonate, 2-carboxypropyl and 2-carboxybutyl phosphonic acid and their corresponding esters and for Component II(b) tris-triethylene glycol phosphate and tris-tripropylene glycol phosphate.

The weight ratio of Component I to Component II is in the range of 1:16 to 5000:1, preferably 1:10 to 50:1.

The composition may also include a suspension agent.

The invention also comprises a process for the manufacture of polyester that is obtained by esterification or transesterification, precondensation and polycondensation, including:

providing a reaction mixture of a polyhydric alcohol and a carboxylic acid containing at least two carboxyl groups or their esters, and addition of catalysts, wherein Components I and II are added to the reaction mixture as catalysts, wherein Component I is a carrier substance on which at least one catalytically effective metal compound is adsorbed, Component II is (a) one or more phosphonic acid compounds of the formula I

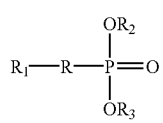

herein two of the groups $R_1$, $R_2$ and $R_3$ are —H and the third group is —H or $C_{1-10}$-alkyl, $C_{3-10}$-cycloalkyl or $C_{6-10}$-aryl, and R is $C_{2-10}$-alkylene-carboxy, $C_{3-10}$-cycloalkylene-carboxy or $C_{6-10}$-arylene-carboxy, wherein the carboxy group is adjacent to $R_1$, and/or (b) one or more compounds of formula I wherein R is O and $R_1$, $R_2$ and $R_3$ are independently tris-trialkylene glycol groups.

Preferably, the residues R, $R_1$, $R_2$ and $R_3$ have the meaning as described above.

The polyesters manufactured according to the process of the invention are synthesized by esterification or transesterification, followed by polycondensation.

As carboxylic acids containing at least two carboxyl groups, dicarboxylic acids such as terephthalic acid, 2,6-naphthalene dicarboxylic acid, isophthalic acid, 1,4-cyclohexane dicarboxylic acid, 1,6-naphthalene dicarboxylic acid, 4,4-biphenyl dicarboxylic acid, adipinic acid, phthalic acid, alkane dicarboxylic acids, copolymers of the foregoing dicarboxylic acids, and esters of the foregoing carboxylic acids can be used.

As polyhydric alcohols, alcohols such as ethylene glycol, 1,3-dihydroxypropane, 1,4-dihydroxybutane, 1,4-cyclohexane dimethanol, diethylene glycol, or polyglycols with a molecular weight below 1000 can be used.

A preferred manufactured polyester is polyethylene terephtalate, which contains 0.5 to 6.0 percent mass of diethylene glycol and 0 to 5.0 percent mass of at least one of isophthalic acid, 2,6-naphthalene dicarboxylic acid, p-hydroxycarboxylic acid, and 1,4-cyclohexane dimethanol as co-monomers.

The process according to the invention is also suitable for the manufacture of polyesters from hydroxycarboxylic acids such as p-hydroxybenzoic acid, lactic acids, glycolic acids, and their co-polyesters with the dicarboxylic acids described above and/or diols.

Also, co-monomers can be used in the process according to the invention.

The process according to the invention for the manufacture of polyester can be carried out continuously or discontinuously.

As a further component, a polyfunctional alcohol can be added in the reaction mixture. A polyfunctional alcohol, such as pentaerythritol, preferably is added in a concentration up to 300 ppm, more preferably about 50 ppm. The polyfunctional alcohol can be added together with Components I and II or separate from them, before, between or after addition of Components I and II, but at the latest during the precondensation of the polyester. Here, no impairment of the effect of the other components occurs.

The metal concentration of the catalytically effective metal compound needed for the reaction in Component I relative to the polyester amounts is preferably in the range of 0.1 to 100 ppm, and more preferably 1 to 20 ppm.

The concentration of the phosphonic acid compound in Component II relative to the polyester can be 0.1 to 80 ppm, preferably 1 to 20 ppm, and more preferably 4 to 8 ppm.

A suspension agent can be added to Component I.

An alcohol and/or alkane diol can be used as the suspension agent for Component I. As alkane diol, 1,2-ethane diol, 1,3-propane diol, and/or 1,4-butane diol are preferable.

The polyhydric alcohol used in the reaction mixture (as described above) also can serve as a suspension agent. Also, an organic liquid that is inert or unreactive in the polyester manufacturing process can be used as suspension agent. Alkanes, cycloalkane or benzene compounds can be used as a neutral organic liquid.

Components I and II are added to the polyester reaction mixture during the time period from before the start of the esterification or transesterification to shortly before the end of the polycondensation, but preferably during esterification or transesterification or before precondensation.

Component I is preferably used as the transesterification catalyst.

If necessary, other additives, such as cobalt or organic dyes or pigments can be added to the reaction mixture in known quantities to add color to the polyester.

The composition according to this invention catalyses the polycondensation at a concentration of at least about 10 ppm of phosphorus as carboxy phosphonic acid.

Also, the composition according to the invention is effective as a polycondensation catalyst at a concentration of at least about 10 ppm of tris-triethylene glycol phosphate or a mixture of about 5 ppm carboxy phosphonic acid and about 5 ppm tris-triethylene glycol phosphate.

Component I does not have a catalytic effect on polycondensation when used together with the known phosphonic acid stabilisers, such as triethyl phosphonic acetate (TEPA, see comparative example).

Furthermore, it has been found surprisingly that the polycondensation is not accelerated solely by the crosslinking property of the carboxy phosphonic acid, but rather by a synergy, which occurs in a surprising manner, between the catalytic system (Component I) and the carboxy phosphonic acid and/or the tris-trialkylene phosphate (Component II). So it has been found that the reaction rate of the catalytic system described in DE 199 08 628.1 can be increased by an additional 50% by a suitable polycondensation catalyst in phosphorus concentrations below 30 ppm.

In the process according to the invention, the polycondensation is catalysed, stabilised and accelerated by the new component system disclosed herein. It has been found that the polycondensation leads to comparable results with substantially less catalyst and stabiliser compared to prior art processes. Furthermore, even highly viscous polyesters can be produced with the process of the invention in demonstrably shorter polycondensation times.

The polyester obtained with the process according to the invention is free of heavy metals and exhibits comparably processing properties compared to conventional polyesters catalysed with antimony. Polyesters produced according to the invention exhibit surprisingly higher thermo-oxidative and thermal stability and, in the manufacture of bottles, a lower recrystallization. High viscosity PET from melt polycondensation made according to the process of the invention contained a significantly lower proportion of acetaldehyde in comparison to the usual high viscosity melt process methods.

The following examples explain the invention.

EXAMPLES

The quoted property figures were determined in the examples as follows:

Intrinsic viscosity (I.V.) was measured at 25° C. on a solution of 500 mg of polyester in 100 ml of a mixture of phenol and 1,2-dichlorobenzene (3:2 parts by weight).

COOH end-group concentration was found by photometric titration with 0.05 n ethanolic potassium hydroxide against bromothymol blue and a solution of a polyester in a mixture of o-cresol and chloroform (70:30 parts by weight).

Determination of diethyl glycol (DEG), isophthalic acid (IPA) and 1,4-cyclohexane dimethanol (CHDM) in the polyester was accomplished using gas chromatography after methanolysis of 1 g of polyester in 30 ml of methanol with the addition of 50 mg/l of zinc acetate in a bomb tube at 200° C.

Saponification number was determined by saponification with potassium hydroxide in n-propanol and potentiometric titration with dimethyl formamide. The degree of esterification (U) was calculated from the saponification number (Vz) and the acid number (Sz) of the reaction mixture according to $U=(Vz-Sz)\times 100/Vz$.

Turbidity in "nephelometric turbidity units" (NTU) was measured in a 10% solution by weight of polyester in phenol/dichlorobenzene (3:2 parts by weight) with a nephelometer from Hach (type XR according to U.S. Pat. No. 4,198,161) in a 22.2 mm diameter cuvette analogous to the standard DIN 38404, Part 2 for water. The intensity of scattered light was measured in comparison to a standard solution of formazine, subtracting the value of the solvent (about 0.3 NTU).

Color values L and b were determined according to HUNTER. Polyester chips were first crystallized in a drying cabinet at 135±5° C. for one hour. The color values were then found in a three range color measurement instrument by measuring the color shade of the polyester sample with three photocells, in the front of each of which was placed a red, green and blue filter (X, Y and Z values): The evaluation occurred according to the HUNTER formula, wherein $$L=10\sqrt{Y}$$

and $$B=(7.0\times(Y-0.8467\times Z))/\sqrt{Y}.$$

The acetaldehyde was driven out of the polyester by heating in an enclosed vessel and the acetaldehyde in the gas space of the vessel was measured by gas chromatography using the Head Space-Injection System HS40 from Perkin Elmer; carrier gas: nitrogen; column: 1.5 m stainless steel; filling: Poropack Q, 80-100 mesh; sample amount: 2 g; heating temperature: 150° C.; heating period 90 min.

Examples 1-5 and Comparative Examples 1-4

The starting point was a completely catalyst-free esterification product of terephthalic acid and ethylene glycol with the following analytical properties:

| | |
|---|---|
| I.V. | 0.20 dl/g |
| Vz | 565 mg KOH/g |
| Sz | 22 mg KOH/g |
| U | 96% |
| DEG | 0.77% by weight |

5000 g each of the esterification product were melted together with the catalyst Component 1 (5 ppm effective metal Ti, adsorbent active carbon), Component II carboxy phosphonic acid (CEPA) (5 ppm P) or tris-triethylene glycol phosphate (TEGPA) (5 ppm P), with or without addition of pentaerytritol (200 ppm), with or without addition of $TiO_2$ (0.33%) with or without the addition of blue dye, with or without the addition of isophthalic acid, with or without the addition of 0.5% by weight of DEG after careful flushing of the reactor with nitrogen, at 275° C. within 50 min. under atmospheric pressure. Then within 50 min. the pressure was gradually reduced to 0.1 mbar and the temperature increased to 280° C. and then polycondensed. The polycondensation was interrupted after reaching a target viscosity of 0.62 dl/g (stirrer current consumption as controlled parameter). The polycondensate was granulated and then analyzed. For the comparative examples, a typical amount of antimony (200 ppm Sb from antimony acetate) employed in the prior art was used as the catalyst. Triethyl phosphonic acetate (TEPA) was included as an additional comparison for Component II.

The results for examples according to this invention are displayed in Table 1 and, for the comparative examples, in Table 2.

TABLE 1

| | Polyester after melt polycondensation | | | | |
|---|---|---|---|---|---|
| Example no. | 1 | 2 | 3 | 4 | 5 |
| Co-monomers [% mass] | IPA 2.0 | IPA 2.0 | IPA 2.0 | None | None |
| | DEG 1.4 | DEG 1.4 | DEG 1.4 | DEG 0.8 | DEG 0.8 |
| $TiO_2$ [% mass] | None | None | None | 0.33 | 0.33 |
| Component I [Metal in ppm] | Ti 3 | Ti 5 | Ti 5 | Ti 5 | Ti 8 |
| Component II [P in ppm] | CEPA 6 | CEPA 6 | TEGPA 6 | CEPA 6 | CEPA 0.2 |
| Penta [ppm] | None | None | Penta 200 | None | None |

TABLE 1-continued

Polyester after melt polycondensation

| Example no. | 1 | 2 | 3 | 4 | 5 |
|---|---|---|---|---|---|
| Antimony catalyst [ppm] | None | None | None | None | None |
| Blue dye [ppm] | 0.5 | 1 | 1 | None | None |
| PC rate up to I.V. 0.62 dl/g [min] | 131 | 77 | 76 | 130 | 124 |

TABLE 2

Polyester after melt polycondensation

| Comparative example no. | 1 | 2 | 3 | 4 |
|---|---|---|---|---|
| Co-monomers [% mass] | IPA 2.0 DEG 1.4 | IPA 2.0 DEG 1.4 | IPA 2.0 DEG 1.4 | None DEG 0.8 |
| TiO$_2$ [% mass] | None | None | None | 0.33 |
| Component I [Metal in ppm] | None | None | Ti 3 | Ti 5 |
| Component II [P in ppm] | CEPA 6 | CEPA 6 | TEPA 6 | None |
| Penta [ppm] | None | None | None | None |
| Antimony catalyst [ppm] | Sb 200 | None | None | None |
| Blue dye [ppm] | 1 | 1 | 0.5 | None |
| PC rate up to I.V. 0.62 dl/g [min] | 130 | I.V. of 0.62 Not obtainable | 163 | 325 |

Antimony catalyst = Antimony triacetate (S 21 from Elf Atochem, Philadelphia, USA) as glycolic solution (comparison)
Component I = Carrier material/Adsorbent is a fine-grained active carbon suspension (8% active carbon in ethylene glycol; mean grain diameter < 0.5 μm; internal area 950 m$^2$/g); adsorbed metal is Ti from Ti (IV) butylate (production of the catalyst suspension in laboratory of Zimmer AG)
Component II = CEPA from Rhodia, UK, as 10% solution in ethylene glycol = TEGPA from Masso, Barcelona, Spain, as 10% solution in ethylene glycol
Stabiliser = TEPA from Rhodia, as 10% solution in ethylene glycol (comparison)
Penta = Pentaerytritol from Degussa, Germany, as 2% solution in ethylene glycol
Blue dye = CI solvent blue 104 from Clariant, F, as 0.05% suspension in ethylene glycol Bottle type granulates of Examples 1-5 and Comparative Examples 1-4 were crystallized for 60 min. in an drying oven filled with nitrogen at 319° C. and then polycondensed in a special laboratory apparatus at 319° C. under stirring and dry nitrogen flow of 200 l/h in the solid phase. The results for examples according to this invention are summarised in Table 3 and for the comparative examples in Table 4.

TABLE 3

Polyester after solid-phase polycondensation

| Example no. | 1 | 2 | 3 | 4 | 5 |
|---|---|---|---|---|---|
| Δ I.V. per hour | 0.018 | 0.019 | 0.019 | Not carried out | Not carried out |
| Turbidity [NTU] | 4–5 | 5–6 | 5–6 | — | — |
| Acetaldehyde [ppm] | 0.6 | 0.4 | 0.4 | — | — |
| Color L | 85 | 84 | 84 | 87* | 86 |
| Color b | −1 | −1.5 | −1.5 | 2.4* | 2.7 |

*Measured on amorphous chips, crystallized

TABLE 4

Polyester after solid-phase polycondensation

| Example no. | 1 | 2 | 3 | 4 |
|---|---|---|---|---|
| Δ I.V. per hour | 0.020 | — | 0.015 | Not carried out |
| Turbidity [NTU] | 3–4 | — | 4–5 | — |
| Acetaldehyde [ppm] | 0.8 | — | 0.7 | — |
| Color L | 88 | — | 84 | Severe yellow cast! |
| Color b | 0 | — | −0.5 | 5 |

Examples 6-9 and Comparative Examples 5-8

In an esterification reactor filled with about 30% of esterification product from the previous charge, 250 kg of a homogeneous paste of terephthalic acid and ethylene glycol were fed in within 80 min. at 260° C. and atmospheric pressure at a mole ratio of 1:1.1 as well as standard proportions of the co-monomers IPA and DEG, a branching agent (when required), Component I as glycolic suspension and blue dye. Additional esterification took place under an increased temperature of 270° C. for 30 min., and Component II was added shortly before termination of esterification. During the complete esterification, the reaction water that formed was separated via a column. Then the reaction pressure was reduced within 20 min. to 10 mbar and the reaction mixture transferred to a polycondenser and polycondensed at 280-285° C. and 2-3 mbar during the stated period of polycondensation. After reaching the desired I.V., the vacuum was set to about 10 mbar and the polyester melt passed to a granulator via a gear pump and granulated. The results for Examples 6-9 are shown in Table 5 and for the Comparative Examples 5-8 in Table 6. In Example 9 and Comparative Example 8 no co-monomers such as IPA and DEG were added. The DEG content in the polymer resulted exclusively from the process. The points of addition for Components I and II were selected as follows:

Component I—addition shortly before termination of esterification.
Component II—added to the paste together with the TiO$_2$-suspension (20% commercially available TiO$_2$ for textile applications in ethylene glycol from Sachtleben GmbH).

TABLE 5

| Example no. | 6 | 7 | 8 | 9 |
|---|---|---|---|---|
| Co-monomers [% mass] | IPA 2.0 DEG 1.4 | IPA 2.0 DEG 1.4 | IPA 2.0 DEG 1.4 | None DEG 1.3 |
| TiO$_2$ [% mass] | None | None | None | 0.34 |
| Component I [metal in ppm] | Ti 5 | Ti 5 | Ti 5 | Ti 5 |
| Component II [P in ppm] | CEPA 6 | TEGPA 6 | CEPA 6 | CEPA 6 |
| Penta [ppm] | None | 200 | None | None |

TABLE 5-continued

| Example no. | 6 | 7 | 8 | 9 |
|---|---|---|---|---|
| Antimony catalyst [ppm] | None | None | None | None |
| Blue dye/red dye [ppm] | 1.2/0.7 | 1.5/1 | 1.5/1.25 | None |
| PC rate [min] | 106 | 112 | 150 | 110 |
| Color L | 75 | 74 | 73 | 91.6* |
| Color b | −3.4 | −4.0 | −1.5 | 2.5* |
| Final IV [dl/g] | 0.60 | 0.60 | 0.80 | 0.63 |
| Turbidity [NTU] | 1.4 | 1.9 | 1.5 | — |
| Acetaldehyde [ppm] | 59 | 58 | 25 | — |

*Color measurement on ground product

TABLE 6

| Comparative Example no. | 5 | 6 | 7 | 8 |
|---|---|---|---|---|
| Co-monomers [% mass] | IPA 2.0 DEG 1.4 | IPA 2.0 DEG 1.4 | IPA 2.0 DEG 1.4 | None DEG 1.3 |
| TiO$_2$ [% mass] | None | None | None | 0.33 |
| Component I [metal in ppm] | None | Ti 5 from Ti (IV) butylate | None | Ti 5 |
| Component II [P in ppm] | H$_3$PO$_4$ 17 | CEPA 6 | H$_3$PO$_4$ 50 | TEPA 6 |
| Penta [ppm] | None | None | None | None |
| Antimony catalyst [ppm] | Sb 200 | None | 260 | None |
| Blue dye/red dye [ppm] | 0.5/0 + 10 Co | 1.0/0 | 1/0 + 25 Co | None |
| PC rate [min] | 115 | 115 | 175 | 125 |
| Color L | 83 | 76 | 78 | 91.0* |
| Color b | −4 | 10 | −2.0 | 2.3* |
| Final IV [dl/g] | 0.60 | 0.60 | 0.80 | 0.63 |
| Turbidity [NTU] | 3.2 | 4 | 4.0 | — |
| Acetaldehyde [ppm] | 58 | 67 | 60 | — |

Then the polymer from Examples 6-7 and the Comparative Examples 5-6 were solid-phase polycondensed as in Examples 1-3 and in the Comparative Examples 1-3. The results are shown in Table 7.

TABLE 7

| | Example no. | | Comparative Example no. | |
|---|---|---|---|---|
| | 6 | 7 | 5 | 6 |
| Color L | 77 | 76 | 85 | 78 |
| Color b | −1 | −1.5 | −0.4 | 11 |
| Δ-IV [dl/g] | 0.019 | 0.021 | 0.021 | 0.013 |
| Acetaldehyde [ppm] | 0.5 | 0.6 | 0.5 | 0.9 |

The products of Example 6 and the Comparative Example 5 were dried in a Challenger dryer at 170° C. for 4 hours and then processed on an ASB Nissei single-stage machine, type 250 EX HT to pre-forms and bottles. A market product from Shell, Caripak P 82, was used as comparison. A 1 l standard CSD bottle with champagne bottom, 39 g weight was produced.

The material adjustment was simple and comparable with the market product, Caripak Shell P 82. The bottles exhibited a high transparency, matched specification in shape retention and pressure resistance and had low acetaldehyde values, <3 μg/l in the bottle (acetaldehyde test (M): Bottles flushed with N$_2$, 72 hours storage at 25° C., measurement of the AA value with head space GC analysis).

The products from Example 8 and the Comparative Example 7 were dried in the pilot tumble dryer at 170° C. for 8 hours in a vacuum (residual moisture <30 ppm), processed to pre-forms with a single tool in a laboratory pre-form machine, Boy 50 T2 and bottles made from them in a laboratory blowing machine, Ecomax 10/2 from Krupp Corpoplast with a double tool under standard conditions, then coated on laboratory scale with SiO$_2$ and the shape retention and pressure resistance and AA content of the bottles tested. The mechanical parameters corresponded to the usual results with market products and the AA content was below the detection limit of the method.

The products from Example 9 and Comparative Example 8 were dried for 16 hours at 160° C. and then spun in a chips spinning mill to a POY according to standard art recognized procedures.

The following parameters were selected:

| | |
|---|---|
| Nominal titer | 84 f 34 dtex |
| Take-off rate | 3,200 m/min |
| Temperature/beam | 290° C. |
| Blown-air speed | 0.35 m/s |
| Preparation | Goulston PT 7642 as emulsion 8% |
| Winding: | |
| 2 galettes | 3,200 m/min |
| Winder | 3,180 m/min |
| Spool running time | 120 min |

For comparison a standard PET from the market (POLYFIN, Indonesia) was used with a DEG content of 1.1% mass.

The textile data obtained is shown in Table 8. Comparable yarn properties were obtained.

TABLE 8

| Parameter | Unit | PET standard | Example 9 | Comparative Example 8 |
|---|---|---|---|---|
| I.V. | [dl/g] | 0.63 | 0.63 | 0.63 |
| Titer | [dtex] | 143.4 | 141.5 | 141.0 |
| Tearing resistance | [cN/dtex] | 25.1 | 25.7 | 25.5 |
| Elongation at tear | [%] | 123 | 129 | 128 |
| Uster NT | [%] | 0.5 | 0.6 | 0.7 |
| Boiling shrinkage | [%] | 62.2 | 66.7 | 66.3 |

We claim:

1. A catalytic composition for the manufacture of polyester, the composition consisting essentially of, as Component I, a carrier substance on which catalytically effective metal compounds are adsorbed and, as Component II (a) one or more phosphonic acid compounds of the formula I

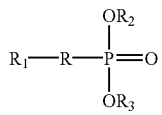

wherein two of the groups $R_1$, $R_2$ and $R_3$ are —H and the third group is —H or $C_{1-10}$-alkyl, $C_{3-10}$-cycloalkyl or $C_{6-10}$-aryl, and R is $C_{2-10}$-alkylene-carboxy, $C_{3-10}$-cycloalkylene-carboxy or $C_{6-10}$-arylene-carboxy, wherein the carboxy group is adjacent to $R_1$, and/or b) one or more compounds of formula I wherein R is O and $R_1$, $R_2$ and $R_3$ are independently tris-trialkylene glycol groups, and, optionally, a suspension agent.

2. The composition according to claim 1, wherein the carrier substance is selected from the group consisting of active carbon, diatomaceous earth, zeolites, synthetic silicates, natural silicates, silicon oxides, silicon hydrates, fullerenes and cross-linked polymers.

3. The composition according to claim 1, wherein the catalytically effective metal compound comprises at least one Ti, Zr, Sb, Ge, Sn or Al metal compound, wherein the metal is present as an ion.

4. The composition according to claim 1, wherein one of the residues $R_1$, $R_2$ and $R_3$ in Component II(a) is selected from the group consisting of hydrogen, methyl and ethyl and the residue R in Component II(a) is selected from the group consisting of 2-carboxy ethyl, 2-carboxy propyl and 2-carboxy butyl.

5. The composition according to claim 1, wherein the residues $R_1$, $R_2$, and $R_3$ in Component II(b) are independently selected from the group consisting of tris-triethylene, tris-tripropylene, and tris-tributylene glycol.

6. The composition according to claim 1, wherein Component I further comprises a suspension agent.

7. The composition according to claim 6, wherein the suspension agent is an alkanol and/or alkane diol.

8. The composition according to claim 7, wherein the alkane diol is 1,2-ethane diol, 1,3-propane diol and/or 1,4-butane diol.

9. The composition according to claim 1, wherein the same polyhydric alcohol is used as the suspension agent as the polyhydric alcohol which is also contained in the reaction mixture for the manufacture of polyester.

10. The composition according to claim 6, wherein the suspension agent is an organic liquid that is unreactive in a polyester synthesis reaction.

11. The composition according to claim 10, wherein the organic liquid is an alkane, cycloalkane, benzene, or mixture thereof.

12. In a process for the manufacture of polyester by esterification or transesterification, precondensation and polycondensation, the improvement comprising providing a reaction mixture from a polyhydric alcohol and a carboxylic acid containing at least two carboxyl groups or its esters, and adding a catalyst thereto, wherein the catalyst consists essentially of at least two Components, I and II, comprising, respectively, as component I: a carrier substance, on which at least one catalytically effective metal compounds is adsorbed, and as component II:

(a) one or more phosphonic acid compounds of the formula I

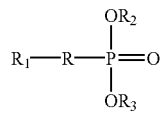

wherein two of the groups $R_1$, $R_2$ and $R_3$ are —H and the third group is —H or alkyl, $C_{3-10}$-cycloalkyl or $C_{6-10}$-aryl, and R is $C_{2-10}$-alkylene-carboxy, $C_{3-10}$-cycloalkylene-carboxy or $C_{6-10}$-arylene-carboxy, wherein the carboxy group is adjacent to $R_1$, and/or b) one or more compounds of formula I wherein R is O and $R_1$, $R_2$ and $R_3$ are independently tris-trialkylene glycol groups, and, optionally, a suspension agent.

13. A polyester, produced according to the process according to claim 12.

* * * * *